United States Patent
Albert et al.

(10) Patent No.: US 11,091,657 B2
(45) Date of Patent: Aug. 17, 2021

(54) COMPOSITION CONTAINING 3-GLYCIDYLOXYPROPYLALKOXYSILANE OLIGOMERS, PROCESS FOR THE PRODUCTION THEREOF AND USE THEREOF

(71) Applicant: Evonik Operations GmbH, Essen (DE)

(72) Inventors: Philipp Albert, Rheinfelden (DE); Julia Kirberg, Rheinfelden (DE); Dennis Bringmann, Efringen-Kirchen (DE); Dominik Hitzler, Bartholomae (DE); Eckhard Just, Rheinfelden (DE)

(73) Assignee: Evonik Operations GmbH, Essen (DE)

( * ) Notice: Subject to any disclaimer, the term of this patent is extended or adjusted under 35 U.S.C. 154(b) by 30 days.

(21) Appl. No.: 16/432,438

(22) Filed: Jun. 5, 2019

(65) Prior Publication Data

US 2020/0102463 A1  Apr. 2, 2020

(30) Foreign Application Priority Data

Sep. 27, 2018  (EP) ........................ 8197270

(51) Int. Cl.
| | | |
|---|---|---|
| *C09D 7/63* | (2018.01) | |
| *B01D 3/06* | (2006.01) | |
| *B01D 3/14* | (2006.01) | |
| *C09D 163/00* | (2006.01) | |
| *C09D 175/04* | (2006.01) | |
| *C08G 77/14* | (2006.01) | |
| *C08G 77/04* | (2006.01) | |
| *C08G 77/08* | (2006.01) | |
| *C08G 77/06* | (2006.01) | |
| *C09D 183/06* | (2006.01) | |
| *C08K 5/5435* | (2006.01) | |

(52) U.S. Cl.
CPC ................ *C09D 7/63* (2018.01); *B01D 3/06* (2013.01); *B01D 3/143* (2013.01); *C08G 77/045* (2013.01); *C08G 77/06* (2013.01); *C08G 77/08* (2013.01); *C08G 77/14* (2013.01); *C09D 163/00* (2013.01); *C09D 175/04* (2013.01); *C09D 183/06* (2013.01); *C08K 5/5435* (2013.01)

(58) Field of Classification Search
CPC ...... C08G 77/08; C08G 77/14; C08G 77/045; C08G 59/306; C08G 59/3281; C08L 83/06; C09D 183/06; C09J 183/06
See application file for complete search history.

(56) References Cited

U.S. PATENT DOCUMENTS

| | | |
|---|---|---|
| 5,650,474 A | 7/1997 | Yamaya et al. |
| 6,008,285 A | 12/1999 | Kasemann et al. |
| 6,391,999 B1 | 5/2002 | Crivello |
| 2004/0234789 A1 | 11/2004 | Treadway |
| 2011/0112221 A1 | 5/2011 | Lejeune et al. |
| 2011/0144226 A1 | 6/2011 | Spyrou et al. |

FOREIGN PATENT DOCUMENTS

| | | |
|---|---|---|
| CN | 106674521 | 5/2017 |
| DE | 10 2007 040 246 | 2/2009 |
| EP | 1 896 522 A1 | 3/2008 |
| EP | 2 428 530 | 3/2012 |
| EP | 1 896 522 | 5/2012 |
| EP | 1 971 658 | 1/2013 |
| EP | 2 794 788 | 7/2015 |
| EP | 3 235 845 | 10/2017 |
| WO | 2006/110331 | 10/2006 |

OTHER PUBLICATIONS

Search Report dated Jan. 18, 2019 in European Application No. 18197270.4.

*Primary Examiner* — Kregg T Brooks
(74) *Attorney, Agent, or Firm* — Grüneberg and Myers PLLC

(57) ABSTRACT

A composition contains a mixture of 3-glycidyloxypropylalkoxysilane oligomers in a proportion of ≥60% by weight based on the composition, which is storage stable over at least 8 weeks at a storage temperature of 60° C., has a colour number of ≤20 mg Pt—Co/l, a pH of not less than 3.5 to not more than 6.5 and a monomer proportion of silane employed in the production of the composition of not more than 5 mol % based on the molar proportion of Si in the composition, wherein the proportion of epoxy groups bound in Si compounds and present in the composition is not less than 95 mol % based on the molar proportion of Si in the composition.

15 Claims, No Drawings

COMPOSITION CONTAINING 3-GLYCIDYLOXYPROPYLALKOXYSILANE OLIGOMERS, PROCESS FOR THE PRODUCTION THEREOF AND USE THEREOF

CROSS-REFERENCE TO RELATED APPLICATIONS

The present application claims the benefit of the European Application EP18197270.4, filed on Sep. 27, 2018, which is incorporated by reference in its entirety.

BACKGROUND OF THE INVENTION

Field of the Invention

The present invention relates to a composition comprising a mixture of 3-glycidyloxypropylalkoxysilane oligomers, in particular of glycidyloxypropylmethoxysilane oligomers, in a proportion of ≥60% by weight based on the sum of all components in the composition, which is storage stable over at least four weeks, has a colour number of ≤20 mg Pt—Co/l, a pH of not less than 3.5 to not more than 6.5 and a monomer proportion of silane employed in the production of the composition of not more than 5 mol % based on the molar proportion of Si in the composition, wherein the proportion of epoxy groups bound in Si compounds and present in the composition is not less than 95 mol % based on the molar proportion of Si in the composition. The invention further relates to a particular process for preparing a composition according to the invention and to the use thereof.

Discussion of the Background

3-Glycidyloxypropyltrimethoxysilane (Dynasylan® GLYMO) and 3-glycidyloxypropyltriethoxysilane (Dynasylan® GLYEO) are silanes employed in many industrial applications. They may be used as additives in lacquer and adhesive formulations, for example as adhesion promoters to improve adhesion to inorganic substrates. Silanes such as GLYMO and GLYEO may be employed in solvent-free, solvent-containing and aqueous formulations. Interesting effects can be found in aqueous acrylate polymer dispersions. The addition of epoxysilanes can not only improve the adhesion of the applied coating to the substrate but also reduce water absorption and improve abrasion resistance. However, the stability of aqueous polymer dispersions additized with silanes/epoxysilanes is limited. Water can hydrolyse the silane and liberate the reactive silanol groups. This can result in crosslinking via the silanol groups, thus increasing viscosity/causing gelation. But the epoxy group of the silane can also undergo hydrolysis in the aqueous formulation and can then no longer react with functional groups on the polymer. Curing agents of 2K PU lacquers are often additized with GLYMO to improve adhesion to inorganic substrates. Epoxysilanes are also used in lacquer and adhesive formulations which are in direct or indirect contact with foodstuffs. In these applications GLYMO is increasingly being called into question due to being classed as toxic. At first glance advantages of GLYMO oligomers compared to GLYMO should include reduced toxicity, a reduced VOC content upon hydrolysis and a higher boiling point. The monomer proportion in the GLYMO oligomer should therefore be as low as possible.

U.S. Pat. No. 5,650,474 describes condensates and cocondensates of silanes containing unsaturated alkyl, epoxy, methacryloyl, acryloyl, amino, hydroxyl, ether, ester and phosphorus groups. The relevant production processes employ inter alia fluoride, such as potassium fluoride, as a condensation catalyst. Thus example 19 discloses a GLYMO homocondensate which after workup has a monomer content of 7.1 mol % and a yellow colour. It is also apparent from U.S. Pat. No. 5,650,474 that acidic and basic catalysts result in low conversions and that these catalysts may open the epoxy groups. Comparative examples 6 and 7 recited in U.S. Pat. No. 5,650,474 employed an acidic catalyst and show a very low conversion in the condensation and a ring opening of the epoxy groups.

EP 3235845 claims the production and use of epoxysilane oligomers and cooligomers. Neutral salts are specified as catalysts.

CN 106674521 claims a process for producing an epoxysilane oligomer. The solvent used is tert-butanol. The catalyst is added dissolved in the hydrolysis water. Catalysts specified include inter alia NaCl or $Na_2CO_3$. However, this process cannot produce colourless oligomer.

"Contemporary Topics in Polymer Science", Volume 4, 1984, page 107 describes the production of a GLYMO oligomer. 0.5 to 5 ml of concentrated HCl are used as catalyst per 30 mmol of Si (GLYMO).

EP 2794788 claims a polysiloxane oligomer composition which is fully hydrolysed and contains only silanol groups and no alkoxy groups. Epoxymethyldialkoxysilanes are used as monomers. The oligomers have a number-average molecular weight of 500 to 700 g/mol.

U.S. Pat. No. 6,008,285 describes a process for producing a composition. Components for the described composition are silanes containing epoxy groups: aluminium or zirconium alkoxide is used as catalyst. Such compositions further contain particles and aromatic polyols. These compositions are employed inter alia for coatings as corrosion protection.

U.S. Pat. No. 6,391,999 claims condensates of epoxysilanes and cocondensates of epoxysilanes and other functional silanes. An ion exchange resin comprising quaternary ammonium ions is employed as a catalyst for the hydrolysis and condensation reaction. The oligomers produced have a molecular weight between 3000 and 10 000 g/mol.

US 2004/0234789 relates to a substrate having a coating, wherein the coating is composed of a hydrolysed epoxy-functional silane, a cationic photoinitiator, an unsaturated monomer comprising free-radical photocatalyst and a non-hydrolysed epoxy-functional silane.

EP 2428530 claims a process for producing an epoxysilane oligomer based on an epoxydialkoxysilane. Claim 2 makes explicit reference to 3-gylcidyloxypropylmethyldiethoxysilane. EP 2428530 further describes a water-based coating formulation comprising particulate metals and additives.

EP 1971658 describes the process for producing a water-based coating composition which contains an epoxysilane oligomer having a viscosity of 7 to 86 mPas and also particulate metals, additives and crosslinkers.

EP 1896522 discloses a process for producing an epoxysilane oligomer having a viscosity of 7 to 86 mPas. The process is performed in the presence of an alcohol-free solvent. Also claimed is an aqueous lacquer composition composed of the epoxysilane oligomer, a particulate metal and also further additives and water.

DE 102007040246 describes the composition of a radiation-curable formulation which in the cured state is said to provide good corrosion protection for metallic substrates.

Also described in addition to the composition is the production of a component composed of an oligomeric epoxysilane. The oligomeric epoxysilane is produced from an epoxysilane in the presence of boric acid.

SUMMARY OF THE INVENTION

The present invention accordingly has for its object to provide starting from a 3-glycidyloxypropyltrialkoxysilane a very simple, environmentally friendly and economic process which provides stable and colourless oligomeric epoxypropylalkoxysilanes as a mixture in the form of a composition having a low residual monomer content [hereinbelow also referred to for short as active substance or oligomeric epoxysilanes or epoxysilane oligomer(s) or composition containing epoxysilane oligomer(s)]. Stable is to be understood as meaning that no further condensation on account of free silanol groups can take place in such an epoxysilane oligomer-containing composition. However, stable is also to be understood as meaning that the epoxy groups in the epoxysilane oligomer do not undergo ring opening as a result of free silanol groups, water or alcohol traces with or without any catalysts present. Such epoxysilane oligomers should further be free from boron/boric acid and ideally have only a very low content of halogen, in particular fluorine/fluoride and chlorine/chloride since halogen/halide can promote the corrosion of metallic substrates upon application.

The stated problem is advantageously solved by the invention according to the features in the present embodiments.

The present invention includes the following embodiments:

1. Composition comprising a mixture of 3-glycidyloxypropylalkoxysilane oligomers in a proportion of ≥60% by weight based on the composition, which is storage stable over at least 8 weeks at a storage temperature of 60° C. has a colour number of ≤20 mg Pt—Co/l, a pH of not less than 3.5 to not more than 6.5 and a monomer proportion of silane employed in the production of the composition of not more than 5 mol % based on the molar proportion of Si in the composition, wherein the proportion of epoxy groups bound in Si compounds and present in the composition is not less than 95 mol % based on the molar proportion of Si in the composition.
2. Composition according to embodiment 1, wherein the composition comprises a mixture of glycidyloxypropylmethoxysilane oligomers.
3. Composition according to embodiment 1 or 2,
   which has a viscosity of 600 to 2000 mPa·s, a content of methanol of less than 0.5% by weight, preferably not more than 0.3% by weight, based on the composition, a molecular weight (Mn) of 600 to 2000 g/mol and is free from organic solvent with the exception of methanol.
4. Composition according to any of embodiments 1 to 3, wherein the composition contains a proportion of 3-glycidyloxypropylalkoxysilane oligomers or 3-glycidyloxypropylmethoxysilane oligomers [i.e. active substance proportion] of ≥90% to 99.9% by weight, in particular ≥95% to ≤99.7% by weight, based on the sum of all components in the composition.
5. Composition according to any of embodiments 1 to 4, having a content of an additive for improving miscibility/solubility with water of <40% by weight, preferably >0.1% to ≤39.5% by weight, based on all components in the composition, wherein preference is given to using polyethylene glycol monomethyl ether or propylene glycol monomethyl ether.
6. Process for producing a composition according to any of embodiments 1 to 5, wherein
   in step 1 3-glycidyloxypropyltrimethoxysilane or a mixture of 3-glycidyloxypropyltrimethoxysilane and a C1- to C8-alkyl trimethoxysilane is employed and in the presence of sodium hydrogencarbonate combined with a defined amount of water and mixed, wherein methanol may optionally be added as a diluent,
   in step 2 the reaction mixture is heated and reacted at 55° C. to 90° C. over 1.5 to 5 hours with mixing, the temperature is subsequently reduced by 5° C. to 10° C. and by addition of a defined amount of acid equivalent, preferably by addition of a solid, acidic ion exchanger, the pH is adjusted to a value of from not less than 3.5 to not more than 6.5, preferably from not less than 4 to not more than 6, in particular not less than 4.5 and not more than 6,
   subsequently in step 3 a distillative workup of the product mixture from step 2 is performed under reduced pressure, the bottoms product after removal of the free methanol is optionally reacted at 100° C. to 150° C. and a pressure of ≤10 mbar over 0.5 to 1.5 hours with mixing and the product thus obtained in the bottom of the distillation unit is subsequently filtered.
7. Process according to embodiment 6,
   wherein methoxysilane and water employed in step 1 are employed in a molar ratio of 1:0.8 to 1.3, preferably of 1:0.9 to 1.25, particularly preferably of 1:1.0 to 1.2.
8. Process according to embodiment 6 or 7,
   wherein in step 1 sodium hydrogencarbonate is employed as catalyst in a molar ratio to employed methoxysilane or ethoxysilane of 0.0001 to 0.06:1, preferably 0.0002 to 0.03:1, particularly preferably 0.0003 to 0.01:1, in particular 0.0004 to 0.008:1.
9. Process according to any of embodiments 6 to 8.
   wherein in addition to 3-glycidyloxypropyltrimethoxysilane a methoxysilane from the group of methyltrimethoxysilane or propyltrimethoxysilane is employed.
10. Aqueous composition obtainable according to any of embodiments 6 to 9.
11. Use of a composition according to any of embodiments 1 to 5, produced according to any of embodiments 6 to 9 or obtainable according to embodiment 10 as a component in epoxy resin formulations, as a coupling reagent in primer solutions, as a sealant on inorganic substrates/substrate surfaces, as a reactive binder, as a cobinder, as an additive in polymer dispersions and as an additive in PU lacquers.

DETAILED DESCRIPTION OF THE INVENTION

It has been found that, surprisingly, colourless and stable oligomeric epoxysilanes having a low monomer content may be produced by a special process with special catalysts. A weakly alkaline catalyst is initially employed for hydrolysis and condensation. This makes it possible to reduce the monomer content to very low quantities. Furthermore, the epoxy groups remain intact and are not opened by the catalyst, the water or the liberated alcohol. After the hydrolysis and condensation, the pH of the reaction mixture is adjusted from slightly alkaline to slightly acidic with an acid or acid reagent. This pH alteration allows discoloration of the oligomer to be prevented. If the hydrolysis and condensation are performed exclusively at an acidic pH, the thus formed oligomer contains silanol groups and also very many monomers. If a very acidic pH were to be established, ring opening of the epoxy group would take place. If the hydrolysis and condensation are performed at exclusively mild alkaline pH low monomer contents can be achieved but the end product has a strong yellow or orange colour. The discoloration has the result that the product can no longer be employed in colour-sensitive formulations and applications. A low monomer content also has toxicological advantages because higher molecular weight epoxy compounds have a lower toxicity classification or need not be classified at all. Furthermore, epoxysilane oligomers having a low monomer content give rise to further advantages in industrial applications. If in a comparative experiment for example GLYMO, an epoxysilane oligomer having a high monomer content and the inventive colourless oligomers having a low monomer content are employed in aqueous acrylate polymer dispersions the inventive oligomers allow a substantially better storage stability to be achieved.

The colourless oligomeric epoxysilanes may be advantageously employed as additives or co-binders both in colour sensitive formulations for coatings and in adhesive and sealing compositions.

Compositions according to the invention are moreover substantially colourless, pourable liquids having excellent storage stability.

Proportions in the composition of boron, for example in the form of boric acid, and also fluoride and chlorides in the form of salts thereof are excluded from the patent subject matter. Thus, an inventive composition comprises only small proportions of fluorine/fluoride and/or chlorine/chloride of not more than 100 ppmw based on the sum of all components in the composition.

Compositions according to the invention are furthermore VOC-free; VOC-free in the present application is to be understood as meaning that a composition according to the invention especially contains not more than 1% by weight of free alcohol, wherein the % by weight value is based on the composition and the alcohol is selected from the group of methanol and ethanol.

A composition according to the invention is moreover substantially free from organic solvents, particularly alcoholic proportions, in particular of methanol, ethanol, propanol or butanol of more than 5% by weight, very particularly of more than 0.3% by weight, based on the content of active substance in the composition.

By way of example—but not exclusively—a composition according to the invention may comprise as the active substance a mixture of 3-glycidyloxypropylalkoxysilane oligomers as per idealized general formula I

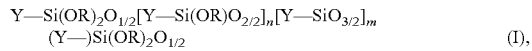
(I), wherein n≥0 and m≥0, groups Y may represent glycidyloxypropyl and the group R may represent for example methyl, ethyl and optionally partially H, preferably methyl.

The present invention provides a composition comprising a mixture of 3-glycidyloxypropylalkoxysilane oligomers, preferably 3-glycidyloxypropylmethoxysilane oligomers, in a proportion of ≥60% by weight based on the composition, which is storage stable over at least 8 weeks at a storage temperature of 60° C., has a colour number of ≤20 mg Pt—Co/l, a pH of not less than 3.5 to not more than 6.5 and a monomer proportion of silane employed in the production of the composition of not more than 5 mol % based on the molar proportion of Si in the composition, wherein the proportion of epoxy groups bound in Si compounds and present in the composition is not less than 95 mol % based on the molar proportion of Si in the composition.

Furthermore, advantageous compositions according to the invention are compositions which have a viscosity of 600 to 2000 mPa·s, a content of methanol of less than 0.5% by weight, preferably not more than 0.3% by weight, based on the composition, a molecular weight (Mn) of 600 to 2000 g/mol and are free from organic solvent with the exception of methanol or ethanol.

Particularly advantageous compositions according to the invention are compositions containing a proportion of 3-glycidyloxypropylalkoxysilane oligomers or 3-glycidyloxypropylmethoxysilane oligomers, i.e. active substance proportion, of ≥90% to 99.9% by weight, in particular ≥95% to ≤99.7% by weight, based on the sum of all components in the composition.

Furthermore, a composition according to the invention may advantageously be provided with a content of an additive for improving miscibility/solubility with water of <40% by weight, preferably >0.1% to ≤39.5% by weight, based on all components in the composition, wherein preference is given to using polyethylene glycol monomethyl ether or propylene glycol monomethyl ether. The methoxy group is advantageously substituted by the polyether alcohol.

The present invention likewise provides a process for producing a composition according to the invention wherein in step 1 3-glycidyloxypropyltrimethoxysilane or a mixture of 3-glycidyloxypropyltrimethoxysilane and a C1- to C8-alkyl trimethoxysilane is employed and in the presence of sodium hydrogencarbonate combined with a defined amount of water and mixed, wherein methanol may optionally be added as a diluent, in step 2 the reaction mixture is heated and reacted at 55° C. to 90° C. over 1.5 to 5 hours with mixing, the temperature is subsequently reduced by 5° C. to 10° C. and by addition of a defined amount of acid equivalent, preferably by addition of a solid, acidic ion exchanger, the pH is adjusted to a value of from not less than 3.5 to not more than 6.5, preferably from not less than 4 to not more than 6, in particular not less than 4.5 and not more than 6, subsequently in step 3 a distillative workup of the product mixture from step 2 is performed under reduced pressure, the bottoms product after removal of the free methanol is optionally reacted at 100° C. to 150° C. and a pressure of ≤10 mbar over 0.5 to 1.5 hours with mixing and the product thus obtained in the bottom of the distillation unit is subsequently filtered.

In step 1 methoxysilane(s) and water are advantageously employed in a molar ratio of 1:0.8 to 1.3, preferably of 1:0.9 to 1.25, particularly preferably of 1:1.0 to 1.2.

Moreover, in step 1 of the process according to the invention sodium hydrogencarbonate may advantageously be employed as catalyst in a molar ratio to employed methoxysilane or ethoxysilane of 0.0001 to 0.06:1, preferably 0.0002 to 0.03:1, particularly preferably 0.0003 to 0.01:1, in particular 0.0004 to 0.008:1.

In addition to 3-glycidyloxypropyltrimethoxysilane a methoxysilane from the group of methyltrimethoxysilane or propyltrimethoxysilane may also be employed in the process according to the invention to advantageously obtain corresponding epoxysilane oligomer cocondensates.

In general, the process according to the invention is performed as follows: The process may be performed in a heatable/coolable stirring apparatus fitted with a reflux cooler, a metered addition unit, a means for protective gas blanketing and a vacuum distillation unit and filtration apparatus connected to the reaction apparatus. 3-Glycidyloxypropyltrimethoxysilane or a mixture of 3-glycidyloxypropyltrimethoxysilane and a C1- to C8-alkyltrimethoxysilane may be initially employed in step 1 of the process. The mixture in the initial charge is combined with sodium hydrogencarbonate and a defined amount of water and mixed with optional addition of methanol as a diluent. In step 2 the thus initially charged reaction mixture is then heated and reacted at 55° C. to 90° C. over 1.5 to 5 hours with mixing. The temperature is subsequently reduced by 5° C. to 10° C. and by addition of a defined amount of acid equivalent, preferably by addition of a solid, acidic ion exchanger, the pH in the present reaction mixture is adjusted to a value of from not less than 3.5 to not more than 6.5, preferably from not less than 4 to not more than 6, in particular not less than 4.5 and not more than 6. This is followed in step 3 by a distillative workup of the present product mixture under reduced pressure and temperature control, i.e. methanol present in the product mixture is substantially removed. After removal of the free methanol the bottoms product may then optionally be post-reacted at 100° C. to 150° C. and a pressure of ≤10 mbar over 0.5 to 1.5 hours with mixing to complete the reaction. The product thus obtained in the bottom of the distillation unit is subsequently filtered. This advantageously affords a clear, slightly viscous and substantially colourless liquid having a relatively high active substance proportion which is free from organic solvent and is storage stable over more than 4 weeks, in particular over ≥8 weeks, wherein the content of monomeric reactant in the thus obtained composition containing epoxysilane oligomers is not more than 5 mol % based on the molar proportion of Si in the composition and the pH has a value of from not less than 3.5 to not more than 6.5.

The present invention accordingly also provides a composition advantageously obtainable by the process according to the invention.

The present invention further provides for the use of a composition according to the invention or produced by the process according to the invention or obtainable by the process according to the invention as a component in epoxy resin formulations, as a coupling reagent in primer solutions, as a sealant on inorganic substrates/substrate surfaces, as a reactive binder, as a cobinder, as an additive in polymer dispersions and as an additive in PU lacquers, wherein a composition according to the invention may be advantageously employed in the isocyanate component for example.

The present invention is elucidated in detail by the examples which follow, without restricting the subject matter of the invention:

EXAMPLES

Analytical Measurements

NMR Measurements:

Instrument: Bruker

Frequency: 400 MHz ($^1$H NMR); 80 MHz ($^{29}$Si NMR)

Scans: 64 ($^1$H NMR): 500 ($^{29}$Si NMR)

Temperature: 294.2 K

Solvent: CDCl$_3$

Standard: tetramethylsilane

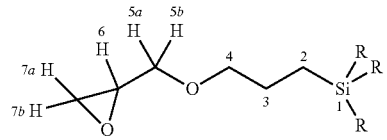

$^1$H NMR (400 MHz, CDCl$_3$) δ=[ppm]=0.65 (m, 2H, H-2): 1.65 (m, 2H, H-3); 2.60 (m, 1H, H-7 a*): 2.82 (m, 1H, H-7 b*): 3.20 (m, 1H, H-6): 3.35 (m, 1H, H-5 a); 3.50 (m, 4H, H-4): 3.4-3.9 (s, —OCH$_3$); 3.75 (m, 1H, H-5 b).

The positions are given the general notation H-1 to H-7.

If unambiguous assignment of the signals was not possible the assigned atoms are marked with an asterisk (*) and are interchangeable.

The signal at 0.65 (H-2) is used as reference for the sum of all employed epoxysilanes (correction by factor of 0.5 since there are 2 protons on the carbon atom). The signal at a shift of 2.82 (H-7 b) corresponded to one of the two protons on the epoxy group. The integral at this shift has to be divided by the corrected integral at 0.65 (H-2) and multiplied by 100.

The obtained value corresponded to the number of intact epoxy groups in mol % in the silane or the hydrolysis product.

$^{29}$Si NMR: (80 MHz, CDCl$_3$) δ=[ppm]=−42 (monomer), −49 to −51 (m-structure), −57 to −61 (d-structure), −68 to −71 (t-structure)

GPC Measurements:

Instrument: Agilent 1100 Series

Calibration: Dynasylan® 6490

Column 1: pre-column MZ Gel SDplus linear 5 μm, 35° C.

Column 2: MZ Gel SDplus 50 A 5 μm, 35° C.

Column 3: MZ Gel SDplus 100 A 5 μm, 35° C.

Column 4: MZ Gel SDplus 50 A 500 μm, 35° C.

Detector: Agilent RID G1362A, 35° C.

Eluent: methyl ethyl ketone

Flow rate: 1.000 ml/min

Injection volume: 250 μm

Measurement interval: 1.000 sec

Weight-Average Molecular Weight (Mw)

$$M_w = \frac{\sum n_i M_i^2}{\sum n_i M_i}$$

and number-average molecular weight (Mn)

$$M_n = \frac{\sum n_i M_i}{\sum n_i}$$

in each case with: $n_i$=amount of substance [mass] of the i-mer, $M_i$=molar mass of the i-mer. Details of the definition for weight average and number average which are known per se to the skilled person are alternatively available to the reader from sources including the Internet, at http://de.wikipedia.org/wiki/Molmassenverteilung, or from a standard work of mathematics.

Determination of Viscosity:

Viscosity was determined at 25° C. according to DIN 53019.

Determination of Colour Number:

Color number was determined according to ISO 4630 and ISO 6271.

Determination of pH:

pH was determined according to DIN 38404-C5. The sample to be measured was mixed with water in a 1:10 ratio and the pH of the aqueous phase measured.

Performance Tests

Determination of Cross-Cut Value:

Cross-cut was determined according to DIN EN ISO 2409. Determination of the cross-cut classification was carried out according to the following assessment scale:

| Description | Classification |
|---|---|
| The cut edges are completely smooth; none of the squares of the cross cut pattern has detached. | 0 |
| Small flakes of the coating have detached at the intersections of the cross-cut lines. Detached area no more than 5% of the cross-cut area. | 1 |
| The coating has detached parallel to the cut edges and/or at the intersections of the cross-cut lines. Detached area more than 5% but no more than 15% of the cross-cut area. | 2 |
| The coating has partially or completely detached in broad strips parallel to the cut edges and/or a number of squares have partially or completely detached. Detached area more than 15% but no more than 35% of the cross-cut area. | 3 |
| The coating has detached in broad strips parailel to the cut edges and/or a number of squares have completely or partially detached. Detached area more than 35% but no more than 65% of the cross-cut area. | 4 |
| All detachment that can no longer be classified under cross-cut classification 4. | 5 |

Determination of Gloss Value:

Gloss value was determined according to DIN EN ISO 2813.

Determination of Layer Thickness of the Coatings:

The layer thickness of the cured coatings was determined with a Fischer Dualscope MP4C layer thickness measuring instrument with the EGAB 1.3 measurement probe according to DIN 50984 and DIN 50981.

Accelerated Weathering Test (QUV-Test):

Accelerated weathering was performed on the basis of the standards DIN EN ISO 11507 and DIN EN ISO 4892.

This comprised subjecting the systems to be tested to the following conditions:

1. 04 h 00 min UVA lamp irradiation cycle (UVA-340) at 55° C.
2. 03 h 55 min condensation cycle at 45° C.
3. 00 h 05 min water spray jet.

Determination of Flow Time with Flow Cup:

The viscosity of the acrylic dispersions was measured during storage stability according to DIN ISO 2431 with a DIN 53211 flow cup having a 4 mm aperture at room temperature (17-24° C.).

Inputs/Reactants

| Chemicals | Purity | Manufacturer |
|---|---|---|
| Dynasylan ® GLYMO | | Evonik Industries |
| Dynasylan ® PTMO | | Evonik Industries |
| Dynasylan ® MTMS | | Evonik Industries |
| $NaHCO_3$ | pure | J. T. Baker |
| $Na_2CO_3$ | Ph. Eur. monographs | J. T. Baker |
| $HNO_3$ | 65% | Merck |
| HCl | 37% | Merck |
| KF | p.A. | Carl Roth |
| Silica gel 6015 | anhydrous | Evonik Industries |
| Ancarez 4010 | | Evonik Industries |
| Ancarez AR 555 | | Evonik Industries |
| Ancamine 2726 | | Evonik Industries |
| Ancamine 419 | | Evonik Industries |
| Epodil 748 | | Evonik Industries |
| Titanium dioxide 2310 | >92.5% | Kronos B.V. |
| Mica MKT | | Imerys |
| ZCP plus | | Heubach |
| PU lacquer ZD-37, sky blue | | Dresdner Lackfabrik |
| PU curing agent ZH62 | | Dresdner Lackfabrik |
| Mowilith LDM 7719 | | Celanese Emulsions GmbH |
| Mowilith DM 7461 | | Celanese Emulsions GmbH |
| Mowilith 756A | | Celanese Emulsions GmbH |
| Tego Dispers 628 | | Evonik Industries |
| Tego Wet 270 | | Evonik Industries |
| Tego Dispers 653 | | Evonik Industries |
| Surfynol DF 110 CF | | Evonik Industries |
| Surfynol 420 | | Evonik Industries |
| Tafigel PUR 61 | | Münzing Chemie GmbH |
| Schwego Flour 6523 | | Schwegmann |

Performance of Comparative Examples 1 to 6 and Inventive Examples 1 to 6:

In a stirring apparatus fitted with a reflux cooler, the relevant amounts of silane I and silane II as reported in table 1 were initially charged under a nitrogen atmosphere. A metered addition unit was used to meter in a mixture of the relevant amounts of water, methanol and catalyst as reported in table 1. The reaction was performed at the relevant reaction temperature and for the relevant reaction duration as reported in table 1. Once the reaction time had elapsed, the reaction mixture was cooled by 5° C. to 10° C., and a defined amount of acid equivalent was metered in as per the inventive examples. Methanol was removed under vacuum. To complete the reaction, the reaction was held at a bottoms temperature >100° C. and a pressure <10 mbar for 1 h with stirring. The thus obtained product was subsequently filtered through a paint filter (nylon fabric, 125 µm, Erich Drehkopf GmbH).

Table comprising comparative examples

| Reactants/parameters/analytical method | [Unit] | Comparative example 1 based on U.S. Pat. 5,650,474 | Comparative example 2 based on U.S. Pat. 5,650,474 | Comparative example 3 based on "comparative example 7" from U.S. Pat. 5,650,474 | Comparative example 4 based on "example 1" from CN 106674521 |
|---|---|---|---|---|---|
| GLYMO (Silane I) | g | 236.2 | 472.0 | 472.2 | 472.2 |
| silane II | g | — | — | — | — |
| water | g | 14.4 | 43.5 | 36.0 | 42.2 |
| methanol | g | 195.6 | 69.9 | 200.0 | 55.5 |
| catalyst |  | KF | KF | HCl | NaCl |
| catalyst | g | 0.58 | 0.3 | 0.08 | 0.016 |
| temperature | °C. | 75 | 50 | 30 | 70 |
| reaction time | min | 120 | 120 | 60 | 390 |
| pH after reaction |  |  |  | 6.4 | 4.3 | 4.8 |
| pH of product |  |  |  | 6.4 | 4.6 | 6.2 |
| $^{29}$Si NMR: monomer | mol % | 6.9 | 1.8 | 16.0 | 4.8 |
| $^{1}$H NMR: intact epoxy | mol % | 100 | 100 | 100 | 100 |
| Mn | g/mol | 854 |  | 702 |  |
| Mw | g/mol | 1462 |  | 1704 |  |
| colour number | mg Pt-Co/l | 230 dark yellow | 425 brown | <5 colourless | 430 orange |

Table comprising comparative examples

| Reactants/parameters/analytical method | [Unit] | Comparative example 5 based on "example 2" from CN 106674521 | Comparative example 6 based on "ESO example 3" from EP 1896522 |
|---|---|---|---|
| GLYMO (Silane I) | g | 472.2 | 650.0 |
| silane II | g | — | — |
| water | g | 27.0 | 47.5 |
| methanol | g | (butanol) 47.0 | (acetone) 114.3 |
| catalyst |  | Na$_2$CO$_3$ | Amberlist |
| catalyst | g | 0.054 | 21.1 |
| temperature | °C. | 40-50 | 120° C. |
| reaction time | min | 1 h (distillation at 90° C.) | 2 h (distillation at 80° C. and 200 mbar) |
| pH after reaction |  | — |  |
| pH of product |  | 7.8 | 6.6 |
| $^{29}$Si NMR: monomer | mol % | 28 | 12.0 |
| $^{1}$H NMR: intact epoxy | mol % | 98 | 96 |
| Mn | g/mol | 236 | 480 |
| Mw | g/mol | 607 | 746 |
| colour number | mg Pt-Co/l | 120 yellow | 125 yellow |

Table comprising inventive examples

| Reactants/parameters/analytical method | [Unit] | Example 1 | Example 2 | Example 3 | Example 4 | Example 5 | Example 6 |
|---|---|---|---|---|---|---|---|
| GLYMO (Silane I) | g | 6607.6 | 6609.3 | 6606.9 | 6635.0 | 472.0 | 472.2 |
| silane II | g | — | — | — | — | 164.1 (PTMO) | 136.0 (MTMS) |
| water | g | 604.9 | 604.9 | 655.7 | 655.0 | 64.1 | 64.1 |
| methanol | g | 350.4 | 350.1 | 350.6 | 350.8 | 90.0 | 90.0 |
| catalyst |  | NaHCO3 | NaHCO$_3$ | NaHCO$_3$ | NaHCO$_3$ | NaHCO$_3$ | NaHCO$_3$ |
| catalyst | g | 1.0 | 0.7 | 1.0 | 1.0 | 0.07 | 0.07 |
| temperature | °C. | 70 | 70 | 70 | 70 | 70 | 70 |
| reaction time | min | 120 | 120 | 180 | 180 | 120 | 420 |
| pH after reaction |  | 7.2 | 7.1 | 7.2 | 7.2 | 7.4 | 7.5 |
| added acid equivalent | eq | 0.22 | 0.22 | 0.22 | 0.22 | 0.16 | 0.16 |
| pH of product |  | 5.4 | 5.8 | 5.8 | 5.8 | 6.0 | 5.3 |
| $^{29}$Si NMR: monomer | mol % | 1.7 | 2.1 | 0.2 | 0.7 | 3.7 | 1.4 |
| $^{1}$H NMR intact epoxy | mol % | 97 | 95 | 100 | 100 | 100 | 97 |
| Mn | g/mol | 1083 | 1018 | 1086 | 1117 | 1199 | 1341 |
| Mw | g/mol | 1671 | 1694 | 1778 | 1748 | 1927 | 2468 |
| colour number | mg Pt—Co/l | <5 colourless | <5 colourless | <5 colourless | <5 colourless | 20 colourless | <5 colourless |
| viscosity | mPa·s | 1060 | 770 | 1570 | 1400 | 857 | 1420 |

Storage Stability Experiments—Storage at 60° C.

Storage stability is an important criterion for a product. Epoxysilanes and silane oligomers in particular can undergo hydrolysis and condensation as a result of atmospheric humidity (water). This causes a molecular weight increase and viscosity increase. However, in the presence of acids, alkalis, or other catalytically active substances, the epoxy group too can be opened by moisture or by methanol liberated during hydrolysis in addition to the silane group. The ring opening forms alcohols which can then react again with the silane, thus resulting in crosslinking. The viscosity increases. In unfavourable cases gelation may even occur. The liberated methanol is not only a problem for stability but also alters the toxicological classification of the product on account of its higher methanol content and alters the flash point of the product, thus also affecting product safety. It is therefore important that oligomeric epoxy silanes are stable during storage, cf. comparison of storage experiments in the following table:

| Silane composition | Storage at 60° C. | Appearance | Mw [g/mol] | intact epoxy in mol % | MeOH % by weight | colour number [mg Pt Co/l] |
|---|---|---|---|---|---|---|
| from comparative example 6 | initial measurement | yellow | 746 | 98 | 0.2 | 125 |
| | 1 week | brown | 877 | 98 | 0.5 | 890 |
| | 2 weeks | brown | 940 | 98 | 0.6 | >800 |
| | 4 weeks | brown | 918 | 96 | 0.6 | 6.9 Gardner |
| | 8 weeks | brown | 1030 | 93 | 0.6 | 8.5 Gardner |
| from comparative example 5 | initial measurement | yellow | 607 | 98 | 0.1 | 120 |
| | 1 week | brown | 650 | 98 | 0.2 | 400 |
| from inventive example 1 | initial measurement | colourless | 1671 | 100 | 0.1 | <5 |
| | 1 week | colourless | 1668 | 100 | 0.1 | <5 |
| | 2 weeks | colourless | 1693 | 100 | 0.1 | <5 |
| | 4 weeks | colourless | 1670 | 100 | 0.1 | <5 |
| | 8 weeks | colourless | 1661 | 100 | 0.1 | <5 |
| from inventive example 2 | initial measurement | colourless | 1694 | 100 | 0.1 | <5 |
| | 1 week | colourless | 1746 | 100 | 0.1 | <5 |
| | 2 weeks | colourless | 1738 | 100 | 0.1 | <5 |
| | 4 weeks | colourless | 1730 | 100 | 0.1 | <5 |
| | 8 weeks | colourless | 1651 | 100 | 0.1 | <5 |

As is apparent from the preceding table, comparative example 6 ("ESO example 3" from EP 1896522) and comparative example 5 (as per CN 106674521) had a slight yellow discoloration from the outset. Storage caused this discoloration to increase. Such products are not employable for some colour-sensitive applications. By contrast, the inventive examples were colourless even upon initial measurement, i.e. directly after synthesis, and during storage did not change over the storage duration even at 60° C. Inventive products are therefore advantageously employable even in colour sensitive applications.

Performance Testing of a Composition Composed of a 2K Epoxy Lacquer and Inventive Compositions from Examples 1 and 6

Adhesion of a Solvent-Containing 2K Epoxy Lacquer on Glass:

Lacquer System:

| | Proportion in % |
|---|---|
| Component A | |
| Ancarez 4010 (liquid DGEBA, EEW = 190) | 57.8 |
| Epodil 748 | 20.5 |
| Titanium dioxide 2310 | 19.24 |
| Tego Dispers 628 | 1.95 |
| Tego Wet 270 | 0.51 |
| Component B | |
| Ancamine 2726 (H-active EQ = 115) | 100 |

| | Component A | Component B |
|---|---|---|
| Mixing ratio | 70 | 30 |
| Epoxide:amine EQ | 1 | 1.2 |

Formulation: The lacquer was formulated from components A and B (0 sample), divided into portions and subsequently 5% by weight respectively of composition [also referred to as silane component] from inventive example 1, from inventive example 6 and, as a comparative sample, monomeric GLYMO were added with stirring. The respective formulations were subsequently applied atop the glass test specimens.

Wet layer thickness: 100 μm
Curing: 7 days at room temperature (17-22° C.)
Test specimen: Glass, Rocholl GmbH
Cleaning of test specimens: Ridoline C72, 10 g/l, 4 min 62° C.
Boiling test: The test specimens were placed in boiling water (100° C.) for 2 h. After the boiling test the test specimens were cooled for one hour and the cross-cut classification was determined.

Result:

| Epoxy lacquer with added silane component | Cross-cut after 2 h boiling test |
|---|---|
| 0 sample | 5 |
| 5% by weight of GLYMO | 5 |
| 5% by weight from example 1 | 1 |
| 5% by weight from example 6 | 2 |

The samples with added so-called silane component from the inventive examples 1 and 6 showed substantially better adhesion after the boiling water test compared to the 0 sample. Furthermore, the formulation containing the monomeric silane GLYMO also showed no possibility of improving adhesion.

Adhesion of an Aqueous 2K EP Lacquer on Steel:

Lacquer System:

|  | Proportion in % |
|---|---|
| Component A | |
| water | 17.1 |
| Tego Dispers 653 | 0.5 |
| Surfynol DF 110 CF | 1.7 |
| Surfynol 420 | 0.7 |
| Heubach ZCP plus | 4.6 |
| Titanium dioxide 2310 | 17.4 |
| Mica MKT | 3.9 |
| Ancarez AR 555 | 52.9 |
| Tafigel PUR 61 | 1.2 |
| Component B | |
| Ancamine 419 | 64.0 |
| 1-methoxy-2-propanol | 18.5 |
| DI water | 17.5 |

|  | Component A | Component B |
|---|---|---|
| Mixing ratio | 80 | 20 |

Formulation: The epoxy lacquer was formulated from components A and B (0 sample), divided into portions and subsequently 5% by weight respectively of composition [also referred to as silane component] from inventive example 3 and, as a comparative sample, monomeric GLYMO were added with stirring. The respective formulations were subsequently applied atop the steel test specimens.

Wet layer thickness: 100 μm

Curing: 7 days at room temperature (17-22° C.)

Test specimen: Steel R-36, Rocholl GmbH

Cleaning of test specimens: Ridoline C72, 10 g/l, 4 min 62° C.

Boiling test: The test specimens were placed in boiling water (100° C.) for 2 h. After the boiling test the test specimens were cooled for one hour and the cross-cut classification was determined.

Result:

| Epoxy lacquer with added silane component | Cross-cut after 2 h boiling test |
|---|---|
| 0 sample | 5 |
| 5% by weight of GLYMO | 2-3 |
| 5% by weight of composition from inventive example 3 | 1-2 |

The sample with added so-called silane component from the inventive example 3 showed substantially better adhesion after the boiling water test compared to the formulation without added silane (0 sample). Addition of the monomeric silane GLYMO also showed poorer adhesion compared to the inventive composition.

Adhesion of a Solvent-Containing 2K-PU Lacquer on Aluminium:

Lacquer system: solvent-containing PU lacquer from Novatic Dresdner Lackfabrik ZD-37, sky blue with curing agent ZH62

Added to the ready to use formulation (0 sample) with stirring were 3.0% by weight of GLYMO and, respectively, inventive composition from example 1, 5 and 6. The respective lacquer formulation was subsequently applied atop the cleaned aluminium substrate with an applicator.

Wet layer thickness: 120 μm

Curing: 14 days at room temperature (17-22° C.)

Test specimen: Aluminium 5005, Rocholl GmbH

Chemicals and cleaning of test specimens:

Bonderite P3-aAA1568eco 152V, 1 min 50° C., 17.5 g/l and Eskaphor AB 7010 4-6%+0.1 to 0.5% Eskaphor EM 101, 5 min 40° C.

Boiling test: The test specimens were placed in boiling water (100° C.) for 2 h. After the boiling test, the test specimens were cooled for one hour and the cross-cut classification was determined.

Result:

| PU lacquer with added silane component | Cross-cut after 2 h boiling test |
|---|---|
| 0 sample | Gt3 |
| 3% by weight of GLYMO | Gt5 |
| 3% by weight from example 1 | Gt0 |
| 3% by weight from example 5 | Gt0 |
| 3% by weight from example 6 | Gt0 |

The formulations comprising the inventive compositions from the examples 1, 5 and 6 showed substantially better adhesion after the boiling water test compared to the formulation without added silane (0 sample). Addition of the monomeric silane GLYMO also showed poor adhesion compared to the inventive compositions.

UV Stability of Pigmented Epoxy Lacquers:

The UV stability of lacquer systems is very important especially in outdoor applications. Therefore, a pigmented 2K epoxy lacquer having the inventive composition from example 1 was tested as an additive and compared with the monomer GLYMO and the composition from comparative example 6 ("ESO example 3" from EP1896522). UV stability was measured/determined inter alia via the residual gloss (QUV test, at 85° C.) of a coating.

Lacquer System:

|  | Proportion % |
|---|---|
| Component A | |
| Ancarez 4010 | 62.2 |
| Epodil 748 | 13.8 |
| TiO$_2$ (Kronos 2310) | 20.7 |
| Tego Dispers 670 | 2.6 |
| Tego Wet 240 | 0.6 |
| Component B | |
| Ancamine 2280 | 100 |

|  | Component A | Component B |
|---|---|---|
| Mixing ratio | 100 | 42 |

The components A and B were mixed in the reported ratio (0 sample). Added with stirring to samples of the ready to use formulation, respectively, were 10.0% by weight of GLYMO and the inventive composition from example 1 and the composition from comparative example 6 ("ESO example 3" from EP1896522). The lacquer formulation was subsequently applied atop the cleaned aluminium substrate with an applicator.

Wet layer thickness: 60 µm

Curing: 80° C. 30 minutes+7 days room temperature

Test specimen: Aluminium 5005, Rocholl GmbH

Cleaning of test specimens: Eskaphor AB 7010, 5% in water+Eskaphor EM 101, 0.3% in water, 2 minutes at 40° C.

The cured test specimens were subjected to the accelerated weathering test. The gloss value was determined regularly.

Results:

| Residual gloss in % according to QUV Test, 85° pigmented epoxy lacquer | | | | | | |
|---|---|---|---|---|---|---|
| | 150 h | 300 h | 450 h | 600 h | 750 h | 900 h |
| 0 sample | 98 | 79 | 33 | 24 | 24 | 24 |
| 10% by weight of GLYMO | 99 | 71 | 34 | 22 | 24 | 22 |
| 10% by weight of composition from inventive example 1 | 101 | 98 | 84 | 80 | 75 | 77 |
| 10% by weight of composition from comparative example 6 | 98 | 92 | 70 | 61 | 56 | 54 |

It was apparent from the examples in the table that the formulation without added silane component (0 sample) and the formulation with 10% by weight of GLYMO achieved a residual gloss of 33% or 34% after 450 hours of weathering in the QUV test. By contrast, the formulations with a 10% by weight addition of the inventive composition from example 1 showed a residual gloss of 84% and the formulation with 10% by weight of the composition from comparative example 6 ("ESO example 3" from EP1896522) showed a residual gloss of 70%. In this example too, the inventive formulation with the inventive composition from example 1 achieved the highest residual gloss. This means that the formulation with the inventive compound from example 1 has the best UV stability.

Stability in Polymer Dispersions:

Silanes are often added as additives to lacquer formulations to improve adhesion, weathering stability or other properties. It is therefore extremely important that the formulations with the silane are stable.

In the following experiments the stability of the inventive oligomers from example 1 in aqueous acrylate polymer dispersions was tested and compared with monomeric GLYMO and a composition from comparative example 6. To this end, 3% by weight respectively of the monomeric GLYMO, a composition from the inventive example 1 and the oligomer from the comparative example 6 ("ESO example 3" from EP1896522) were added to an aqueous acrylate polymer dispersion with stirring. The viscosity of the formulations was measured via the flow time with the flow cup. The formulated dispersions were then stored at room temperature (25° C.). The viscosity of the formulations was measured at regular intervals. The results are summarized in the following table:

Result:

| | | initial | 14 days | 30 days | 60 days |
|---|---|---|---|---|---|
| Mowilith LDM 7719 | 0 sample | 57 | 57 | 57 | 57 |
| | 3% by weight of GLYMO | 39 | solid | solid | solid |
| | 3% by weight of composition from inventive example 1 | 52 | 60 | 68 | 71 |
| | 3% by weight of composition from comparative example 6 | 50 | solid | solid | solid |
| Mowilith DM 7416 | 0 sample | 40 | 40 | 40 | 40 |
| | 3% by weight of GLYMO | 36 | solid | solid | solid |
| | 3% by weight of composition from inventive example 1 | 43 | 40 | 42 | 41 |
| | 3% by weight of composition from comparative example 6 | 32 | solid | solid | solid |

It was apparent from the table that the viscosity of the polymer dispersions (Mowilith LDM 7719 and Mowilith DM 7416) did not change without a silane additive. By contrast, the formulations with Mowilith LDM 7719 and 3% by weight of GLYMO or the oligomer from comparative example 6 were solid after only 14 days. By contrast, the formulation with the composition from inventive example 1 showed only a slight increase in viscosity.

Formulations with the polymer dispersion Mowilith DM 7416 exhibited similar behaviour. The polymer dispersion without silane did not undergo a change in viscosity while the polymer dispersion Mowilith DM 7416 with 3% by weight of GLYMO or the oligomer from comparative example 6 became solid after only 14 days. The formulation with the inventive oligomer from example 1 showed no change in viscosity even after 60 days. It has accordingly been shown that the inventive oligomers from example 1 are very stable in polymer dispersions and are therefore also particularly advantageously suitable as an additive for polymer dispersions.

The invention claimed is:

1. A composition, comprising:
   a mixture of
     3-glycidyloxypropylalkoxysilane oligomers in a proportion of ≥60% by weight based on the composition,
     which is storage stable over at least 8 weeks at a storage temperature of 60° C., has a colour number of ≤20 mg Pt—Co/l, a pH of not less than 3.5 to not more than 6.5, and
     a monomer proportion of silane employed in the production of the composition, of not more than 5 mol % based on the molar proportion of Si in the composition,
     wherein the proportion of epoxy groups bound in Si compound and present in the composition is not less than 95 mol % based on the molar proportion of epoxy groups employed in production of the oligomers.

2. The composition according to claim 1, wherein the composition comprises a mixture of glycidyloxypropylmethoxysilane oligomers.

3. The composition according to claim 1,
which has a viscosity of 600 to 2000 mPa·s,
a content of methanol of less than 0.5% by weight, based on the composition,
a molecular weight (Mn) of 600 to 2000 g/mol, and
is free from an organic solvent with the exception of methanol.

4. The composition according to claim 1,
wherein the composition contains a proportion of 3-glycidyloxypropylalkoxysilane oligomers or 3-glycidyloxypropylmethoxysilane oligomers of ≥90% to 99.9% by weight, based on the sum of all components in the composition.

5. The composition according to claim 1,
having a content of an additive for improving miscibility/solubility with water of <40% by weight, based on all components in the composition.

6. The composition according to claim 5, wherein the additive is polyethylene glycol monomethyl ether, propylene glycol monomethyl ether, or mixtures thereof.

7. A process for producing a composition according to claim 1, the process comprising:

(1) employing 3-glycidyloxypropyltrialkoxysilane, and mixing in the presence of sodium hydrogencarbonate combined with water, wherein methanol may optionally be added as a diluent, (2) heating the reaction mixture from (1) and reacting at 55° C. to 90° C. over 1.5 to 5 hours with mixing, subsequently, reducing the temperature by 5° C. to 10° C., and adjusting, by addition of a defined amount of an acid equivalent, the pH to a value of from not less than 3.5 to not more than 6.5;

(3) performing a distillative workup of the product mixture from (2) under reduced pressure, optionally reacting the bottoms product after removal of the free methanol at 100° C. to 150° C. and a pressure of ≤10 mbar over 0.5 to 1.5 hours with mixing, and subsequently filtering the product thus obtained in the bottom of the distillation unit.

8. The process according to claim 7, wherein alkoxysilane groups and water employed in (1) are employed in a molar ratio of 1:0.8 to 1.3.

9. The process according to claim 7, wherein in (1), sodium hydrogencarbonate is employed as a catalyst in a molar ratio to employed alkoxysilane groups of 0.0001 to 0.06:1.

10. The process according to claim 7, wherein, in addition to the 3-glycidyloxypropyltrialkoxysilane, at least one alkoxysilane is employed from the group consisting of methyltrimethoxysilane and propyltrimethoxysilane.

11. An aqueous composition obtainable according to claim 7.

12. The process according to claim 7, wherein in (2), the acid equivalent is a solid, acidic ion exchanger.

13. The process according to claim 7, wherein the following is performed:
reacting the bottoms product after removal of the free methanol at 100° C. to 150° C. and a pressure of <10 mbar over 0.5 to 1.5 hours with mixing, and subsequently filtering the product thus obtained in the bottom of the distillation unit.

14. The process according to claim 7, wherein in step (1), a mixture of 3-glycidyloxypropyltrialkoxysilane and a $C_1$— to $C_8$-alkyl trimethoxysilane is employed.

15. A method, comprising:
mixing the composition according to claim 1, to form at least one composition selected from the group consisting of: a component in epoxy resin formulations, a coupling reagent in primer solutions, a sealant on inorganic substrates/substrate surfaces, a reactive binder, a cobinder, an additive in polymer dispersions, and an additive in PU lacquers.

* * * * *

UNITED STATES PATENT AND TRADEMARK OFFICE
CERTIFICATE OF CORRECTION

Page 1 of 1

PATENT NO. : 11,091,657 B2
APPLICATION NO. : 16/432438
DATED : August 17, 2021
INVENTOR(S) : Philipp Albert et al.

It is certified that error appears in the above-identified patent and that said Letters Patent is hereby corrected as shown below:

On the Title Page

The Foreign Application Priority Data section reads:
"Sep. 27, 2018 (EP) ... 8197270",
And should be:
-- Sep. 27, 2018 (EP) ... 18197270.4 --

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*